US012656665B2

(12) United States Patent
    Lindner

(10) Patent No.: US 12,656,665 B2
(45) Date of Patent: *Jun. 16, 2026

(54) NOZZLE MOUNTED CAMERA

(71) Applicant: ENVIROSIGHT LLC, Randolph, NJ (US)

(72) Inventor: Richard Lindner, Morristown, NJ (US)

(73) Assignee: ENVIROSIGHT LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/803,232

(22) Filed: Aug. 13, 2024

(65) Prior Publication Data

US 2025/0147392 A1     May 8, 2025

Related U.S. Application Data

(63) Continuation of application No. 17/521,444, filed on Nov. 8, 2021, now Pat. No. 12,061,412, which is a
(Continued)

(51) Int. Cl.
    *G03B 17/56* (2021.01)
    *F16L 55/38* (2006.01)
    (Continued)

(52) U.S. Cl.
    CPC ............ *G03B 17/561* (2013.01); *F16L 55/38* (2013.01); *H04N 23/51* (2023.01); *F16L 2101/30* (2013.01); *H04N 7/185* (2013.01)

(58) Field of Classification Search
    CPC .... G03B 17/561; F16L 55/38; F16L 2101/30; H04N 5/2252; H04N 7/185
    See application file for complete search history.

(56) References Cited

U.S. PATENT DOCUMENTS 5,622,571 A    4/1997 Derlein
7,591,901 B1   9/2009 Weisenberg
           (Continued)

FOREIGN PATENT DOCUMENTS

CH       702245    * 11/2009
CN    106024331    *  8/2016
           (Continued)

OTHER PUBLICATIONS

Huang, Liang, translation of CN-209382005, Jan. 2019 (Year: 2019).*
(Continued)

*Primary Examiner* — Zaihan Jiang
(74) *Attorney, Agent, or Firm* — FisherBroyles, LLP

(57)     ABSTRACT

An inspection system comprising (a) one or more sleds, each sled comprising (i) three or more rails running lengthwise and defining a diameter and a central axis of said each sled, (ii) first and second mounts, (iii) a nozzle comprising an interface configured for connection to a hose, and (iv) one or more jets configured for communicating fluid from said hose outward; (c) a camera module comprising (i) a housing, (ii) a camera having an optical axis, (iii) one or more lights; (iv) at least one battery, (v) memory operatively connected to said camera for recording images from said camera; and (vi) front and rear members for interengaging with said first and second mounts, respectively, such that at least one of said front or rear members urges against said first or second mounts to secure said camera module to said each sled such that said optical axis is essentially coincident with said central axis.

16 Claims, 8 Drawing Sheets

Related U.S. Application Data continuation of application No. PCT/US2020/032182, filed on May 8, 2020.

(60) Provisional application No. 62/845,243, filed on May 8, 2019.

(51) Int. Cl.
  *F16L 101/30* (2006.01)
  *H04N 7/18* (2006.01)
  *H04N 23/51* (2023.01)

(56) References Cited

U.S. PATENT DOCUMENTS

| | | | |
|---|---|---|---|
| 9,784,599 B1 | 10/2017 | Close | |
| 2004/0020270 A1 | 2/2004 | Kuikka | |
| 2012/0319477 A1* | 12/2012 | Brownlee | H02J 3/32 |
| | | | 307/64 |
| 2014/0055793 A1 | 2/2014 | Johnsen | |
| 2014/0247324 A1* | 9/2014 | Cury | G03B 17/08 |
| | | | 348/36 |
| 2014/0247338 A1 | 9/2014 | Kessler | |
| 2014/0285656 A1 | 9/2014 | Zink | |
| 2015/0192237 A1* | 7/2015 | Kiest, Jr. | F16L 55/1654 |
| | | | 138/97 |
| 2017/0276284 A1 | 9/2017 | Finodeyev | |
| 2017/0366711 A1* | 12/2017 | Kessler | E03F 7/12 |
| 2018/0013941 A1 | 1/2018 | Freeman | |
| 2018/0054598 A1* | 2/2018 | Maschhoff | H04N 7/18 |

FOREIGN PATENT DOCUMENTS

| | | | | |
|---|---|---|---|---|
| CN | 208605889 | * | 8/2018 | |
| CN | 209382005 | * | 1/2019 | |
| DE | 102007013657 B3 | * | 8/2008 | ....... G08B 13/19623 |
| DE | 202016101181 U1 | | 6/2017 | |
| KR | 20050021106 A | * | 3/2005 | |

OTHER PUBLICATIONS

Wu, Guo-bing translation of CN-208605889 Aug. 2018 (Year: 2018).*

Wang, Jian-shun translation of CN-106024331 Aug. 2016 (Year: 2016).*

Koch Carl J translation of CH-702245 Nov. 2009 (Year: 2009).*

Salewski M translation of DE-102007013657-B3 Aug. 2008 (Year: 2008).*

Kim, Jun translation of KR 20050021106 Mar. 2005 (Year: 2005).*

Coincident meaning 2023 (Year: 2023).

Defining meaning 2023 (Year: 2023).

German Office Action mailed Nov. 10, 2023, in Application No. 11 2020 002 269.2, including English translation.

Inter engaging meaning 2023 (Year: 2023).

International Search Report mailed Aug. 6, 2020 in International Application No. PCT/US2020/032182.

Toolless definition 2023 (Year: 2023).

Written Opinion of the International Searching Authority mailed Aug. 6, 2020 in International Application No. PCT/US2020/032182.

* cited by examiner

NOZZLE MOUNTED CAMERA

CROSS-REFERENCE TO RELATED APPLICATION

This application is a continuation of U.S. application Ser. No. 17/521,444, filed Nov. 8, 2021, which is a continuation of International Application No. PCT/US2020/032182, filed May 8, 2020, which is related and claims the benefit of U.S. Provisional Application No. 62/845,243, filed May 8, 2019, which is hereby incorporated by reference in its entirety.

FIELD OF INVENTION

The present invention relates to a camera system for imaging the inside of pipes, and, more specifically, to a nozzle-mounted camera for inspecting municipal pipes.

BACKGROUND

Most municipalities contain a vast network of storm and sewer pipes, often representing the oldest infrastructure in the community. Periodically, these pipes must be inspected for problems such as cracks, blockage, build-up, and root infiltration. To this end, it is common for a device such as a pipe crawler or push camera to be introduced into the pipe to perform the inspection. Although effective in obtaining detailed images, using a pipe crawler is inconvenient and requires a great deal of time to set up and operate even if no problem is discovered. Furthermore, the use of pipe crawlers is frequently limited by the size and configuration of pipes to be entered. In this regard, often the condition of the pipe (e.g., debris and fractures) prevents the use of inspection devices like crawlers.

The inefficiencies associated with routine inspections are exacerbated in situations where the pipes need to be cleaned since pipe inspection and cleaning are typically performed by different personnel, often at different times. In a typical cleaning operation, an inspection is performed initially to determine whether the pipes are blocked. Such an inspection tends to be excessive since blockage conditions can be determined usually without the precision required for assessing cracks and other pipe damage. If a blockage is detected, then cleaning personnel must be brought in to perform an invasive cleaning operation. Once the cleaning procedure is performed, a second inspection is typically required to ensure that the blockage has been removed. This second inspection requires the inspection personnel to return and perform yet another invasive inspection (which as mentioned above is excessive in the first instance) to confirm whether the blockage has been removed. If the cleaning was not sufficient, then the cleaning personnel must return to continue the cleaning operation, and the cleaning/inspection process is repeated yet again. Thus, in this cleaning process, an inconvenient and excessive inspection is repeated between each cleaning causing delays and driving up costs.

Therefore, there is a need for a more convenient approach to inspect and maintain underground pipes without the time and complexity associated with specialized inspection techniques inherent in the use of pipe crawlers or push cameras. Although U.S. Patent Application Publication No. US-20140247338, herein incorporated by reference, addresses some of these concerns, the disclosed device lacked versatility in use with pipes of different diameter. More specifically, Applicant has identified a need for a nozzle-mounted camera that is readily configurable for use in pipes of different sizes. The present invention fulfils this need among others.

SUMMARY OF INVENTION

The following presents a simplified summary of the invention to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, an inspection system is disclosed comprising: (a) one or more sleds, each sled comprising at least: (i) a plurality of rails running lengthwise and defining a central axis of each sled, (ii) at least a first mount and a second mount, wherein the first mount defines a first engagement member for interengaging a front member of a camera module and the second mount comprises a second engagement member for interengaging a rear member of the camera module; (iii) at least one nozzle comprising an interface configured for connection to a hose and one or more jets configured for communicating fluid from the hose outward; (b) said camera module comprising at least, (i) a housing; (ii) a camera in the housing and having an optical axis; (iii) at least one battery; and (iv) the front and rear members for toollessly interengaging with the first and second engagement members, respectively, such that the optical axis is essentially coincident with the central axis. For example, in one embodiment, at least one of the front or rear members is biased axially and outwardly from the housing such that when the camera module is disposed between the first and second mounts at least one of the front or rear members urges against the first or second mounts to secure the camera module to each sled.

One aspect of one embodiment of the present invention is the ability of the camera module to be configured toollessly with different sleds. That is, in one embodiment, the sleds are interchangeable with a given camera module without the need for tools. This allows a single camera module to be interchanged with different sleds of different diameters to accommodate different pipe sizes.

In addition to the inter-engagement of the first and second engagement mechanisms with the front and back members respectively providing for toolless sleds interchangeability, the mechanism also provides for self-leveling. That is, in one embodiment, the first and second engagement mechanisms rotatably engage with the front and back members, respectively, such that the camera module rotates relative to the sled.

Still other advantages of the present invention will be apparent to those of skill in the art in light of the specification below.

DETAILED DESCRIPTION

Figure 1:
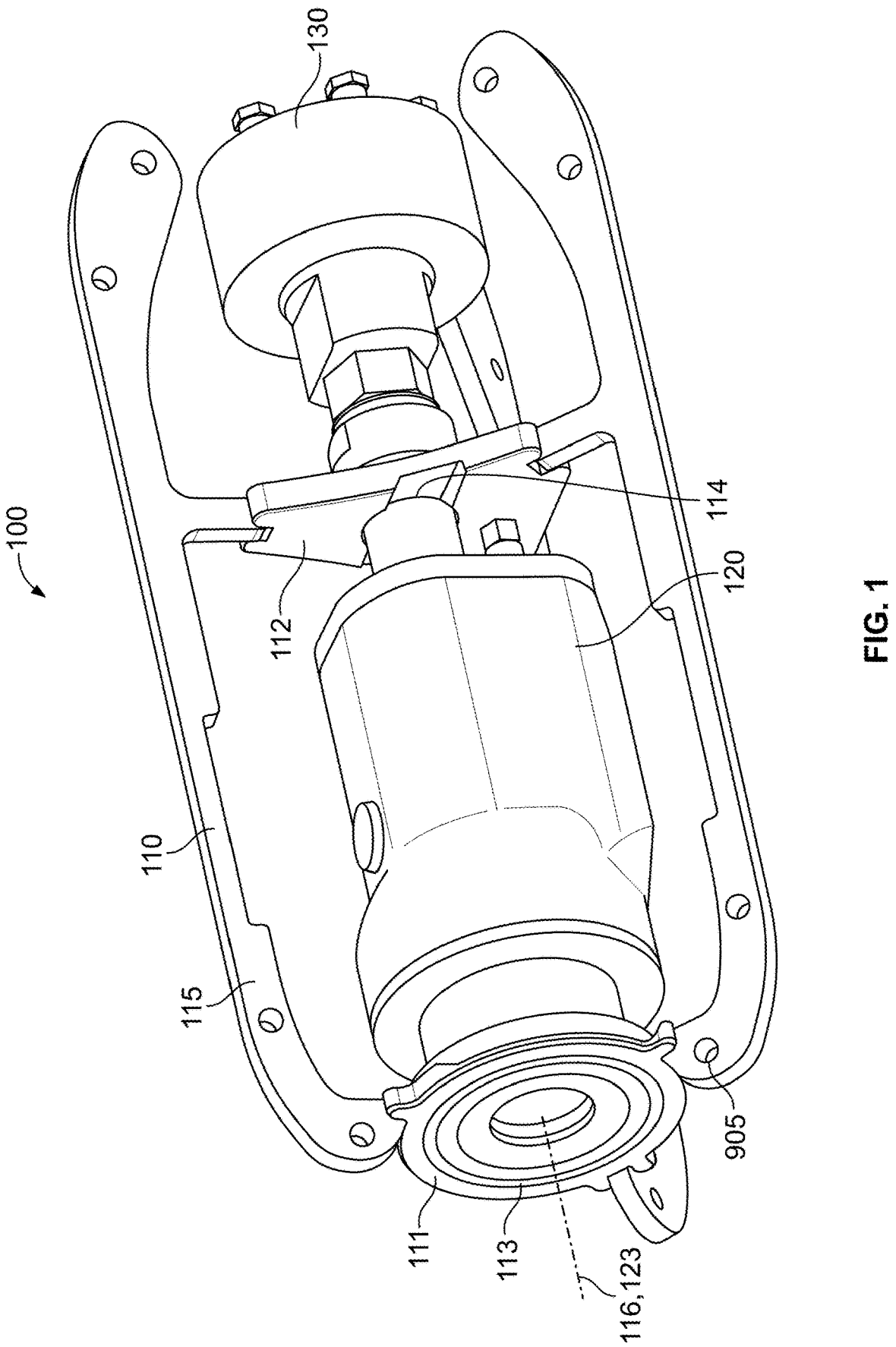
FIG. 1 shows a perspective view of one embodiment of the nozzle-mounted camera system of the present invention.
Figure 2:
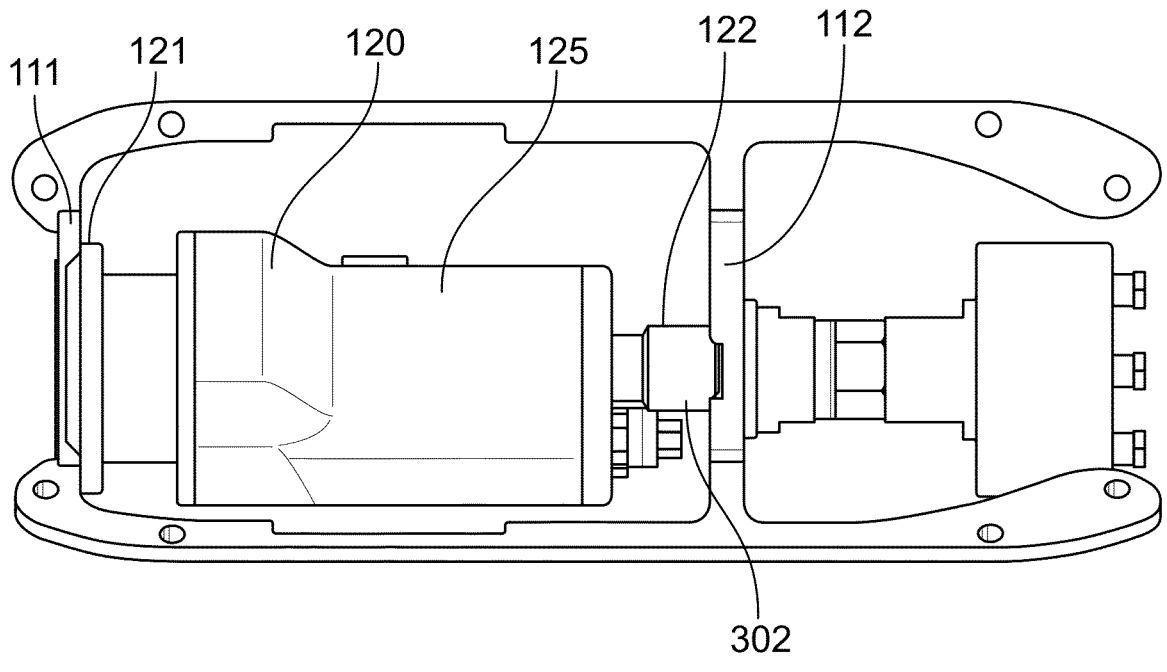
FIG. 2 shows a side view of the system of FIG. 1.
Figure 3:
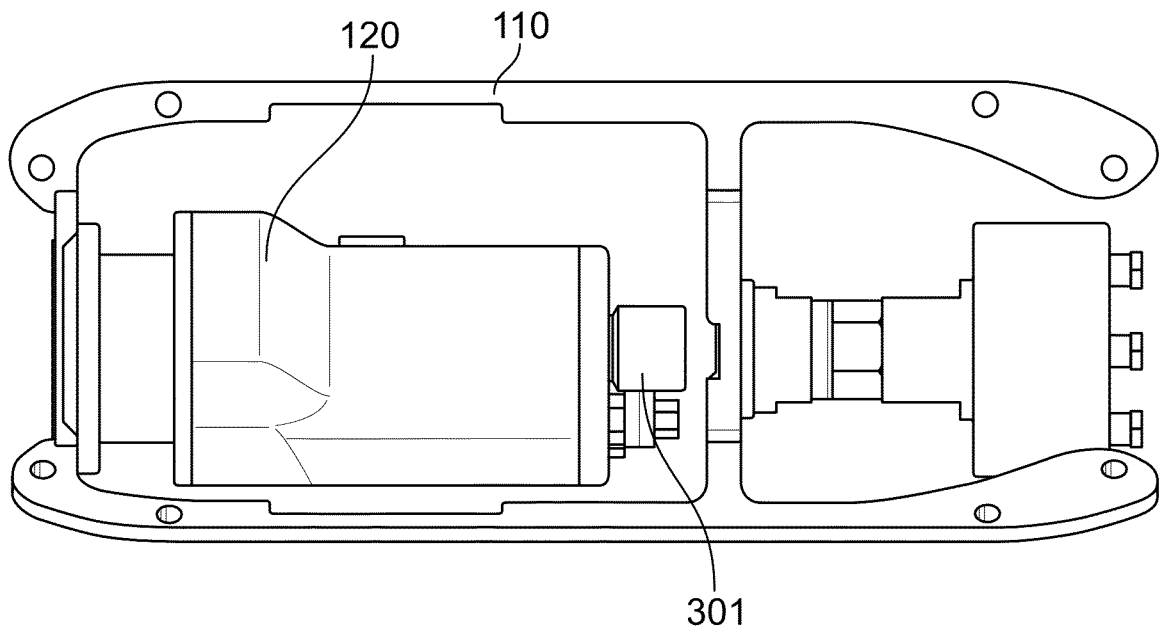
FIG. 3 shows a side view of the system of FIG. 1 with the camera module disengaged from the rear amount of the sled.
Figure 11:
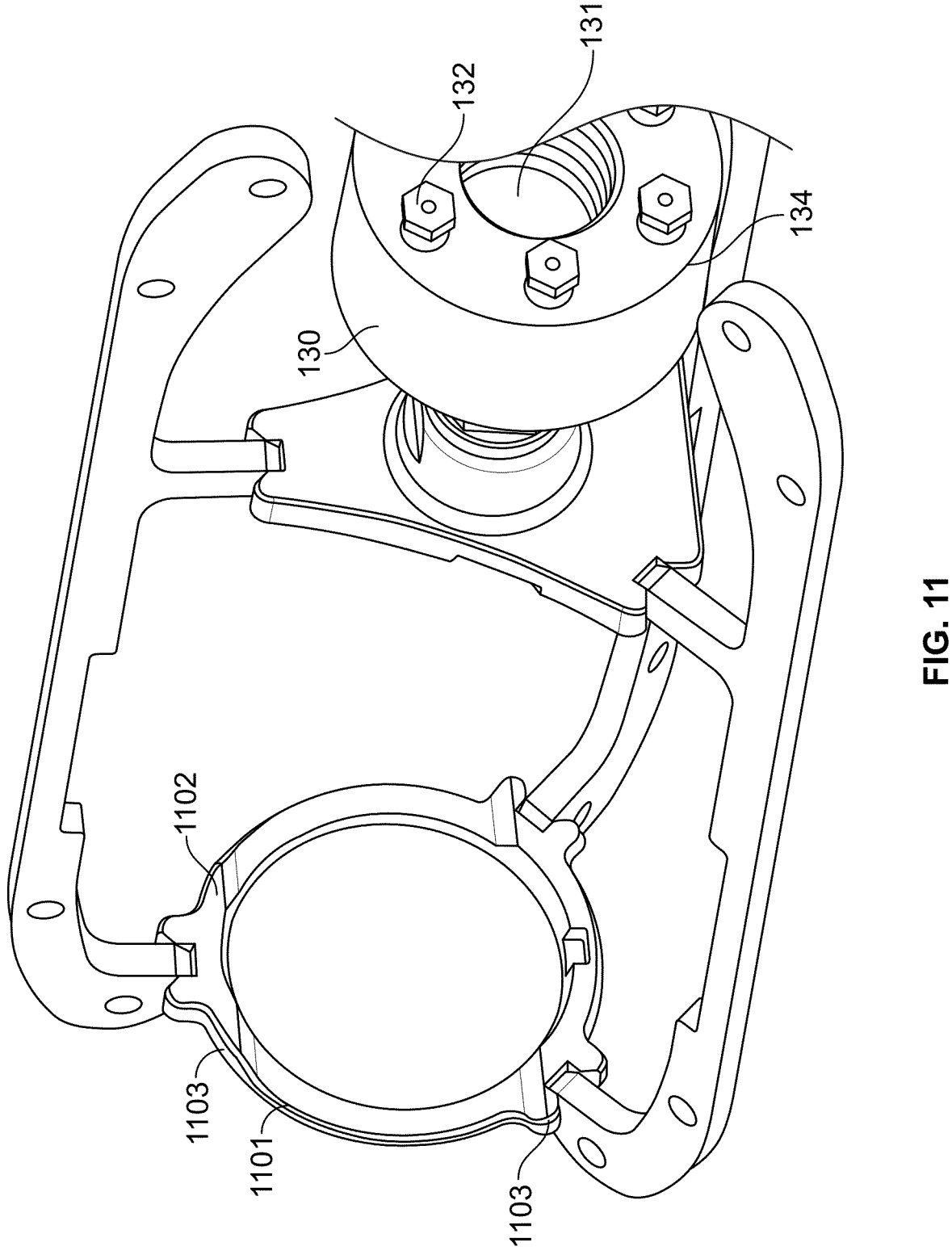
FIG. 11 shows a rear perspective view of one embodiment of the sled of the present invention.

Referring to FIGS. 1-3, one embodiment of the inspection system 100 of the present invention is disclosed. The system 100 comprises (a) one or more sleds 110, each sled 110 comprising a plurality of rails 115 (in this embodiment three) running lengthwise and defining a central axis 116 of each sled. The sled also comprises a first mount 111 and a second mount 112, wherein the first mount 111 defines a first engagement member 113 for interengaging a front member 121 of a camera module 120 and the second mount 112 comprises a second engagement member 114 for interengaging a rear member 122 of the camera module. Referring to FIGS. 1 and 11, the system 100 also comprises at least one nozzle 130 comprising an interface 131 configured for connection to a hose (not shown) and one or more jets 132 configured for communicating fluid from the hose outward.

The system 100 also comprises the camera module 120 comprising at least a housing 125 in a number of components contained in the housing, such as, for example, a camera (not shown) having an optical axis 123, at least one battery (not shown), and memory operatively connected to the camera for recording images from the camera. In one embodiment, the camera module 120 also comprises one or more lights 124 in the housing (see FIG. 4). In this particular embodiment, the one or more lights 124 comprises a ring of LED lights, although other embodiments are possible such as, for example, individual/discrete LED lights which may be outside the housing 125.

The camera module also comprises the front and rear members 121, 122 for interengaging with the first and second engagement members, 112, 114, respectively. In one embodiment, at least one of the front or rear members is biased axially and outwardly from the housing such that when the camera module is disposed between the first and second mounts at least one of the front or rear members urges against the first or second mounts to secure the camera module to the sled such that the optical axis is essentially coincident with the central axis.

Details of the product features and method steps are discussed in greater detail below.

An important aspect of one embodiment of the present invention is the ability of the camera module to be configured toollessly with different sleds. That is, in one embodiment, the sleds are interchangeable with a given camera module without the need for tools. This allows a single camera module to be interchanged with different sleds of different diameters to accommodate different pipe sizes.

In one embodiment, the toolless interchange of the camera module with different sleds is achieved by virtue of the camera module being resiliently held between the first and second mounts. This can be achieved in different ways. For example, in one embodiment, portions of the camera module are biased outwardly to urge against the first or second mounts to hold the camera module in position in the sled. Alternatively, the sled may be configured with biased mounts to essentially squeeze the camera module to hold it in place. In one embodiment, the rear member is biased axially and outwardly from the camera module. In one embodiment, the rear member has a retracted position 301 and an extended position 302 as shown in FIGS. 3 and 2 respectively. As shown in FIG. 2, when the rear member 122 is in its extended position 302, it urges against the second mount 112 to force the front member 121 against the first mount 111, thereby securing the camera module between the first and second mounts.

In one embodiment, the rear member comprises a retention mechanism to lock the rear member in the retracted position to facilitate installation/removal from the sled. Specifically, as shown in FIG. 3, to facilitate installation of the camera module 120 in the sled 110, the rear member is held in the retracted position. Once the camera module is positioned between the first and second mounts, the rear member is released from its retracted position and allowed to extend toward its extended position to provide an urging force against the second mount as described above. In one embodiment, the retention mechanism is configured such that a partial revolution of the rear member relative to the camera module engages/disengages the rear member from the retracted position. For example, a user may push the rear member in to compress the resilient means (e.g., spring, gas compression cylinder, etc.), and then rotate the rear member slightly (e.g. ⅛-¼ rotation) to lock the rear member in the retracted position. Those of skill in the art will understand different embodiment of such a mechanism in light of this disclosure and requires, including, for example, a pin and slot configuration. In one embodiment, the retention mechanism functions to release the rear member from the retracted position in the opposite manner in which it is retained—i.e. a counter rotation. Rather than a rotation mechanism, the retention mechanism may comprise a latch mechanism in which the rear member is pushed forward and latched in the retracted position. Releasing the rear member in such an embodiment would involve actuating the latch. Still other mechanisms will be known to those of skill in the art.

Figure 12:
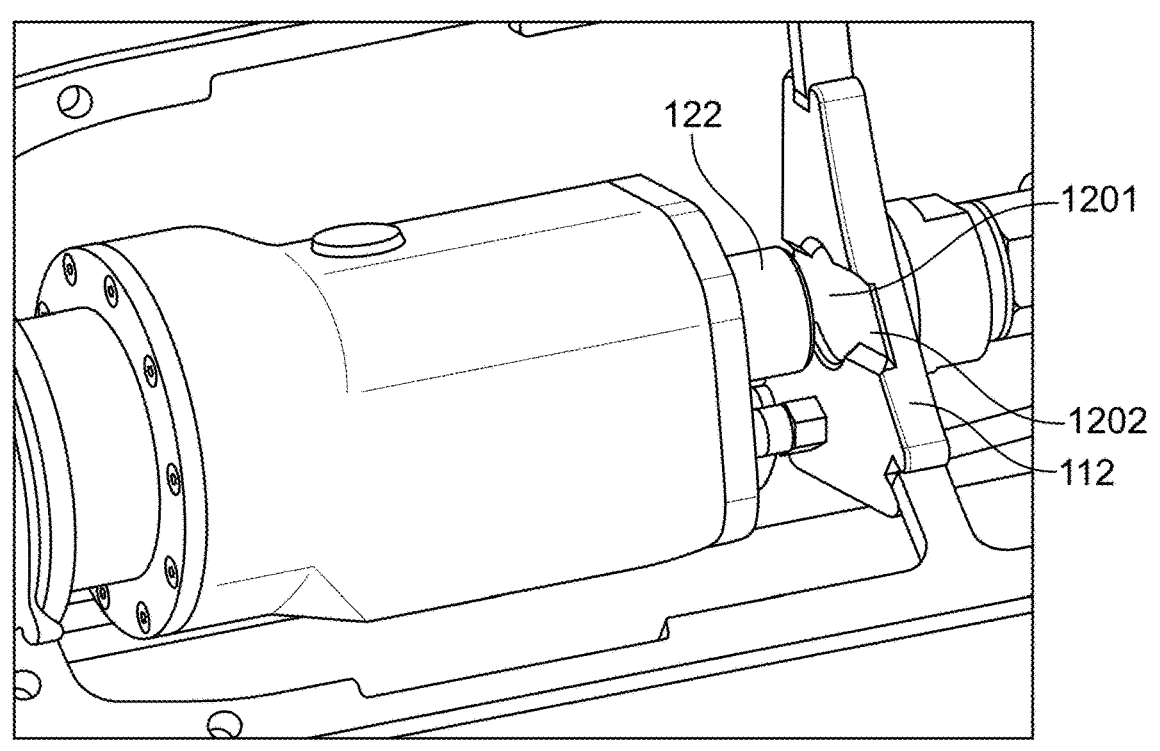
FIG. 12 shows a perspective view of the camera module being installed into a sled with the rear member in the retracted position.
Figure 13:
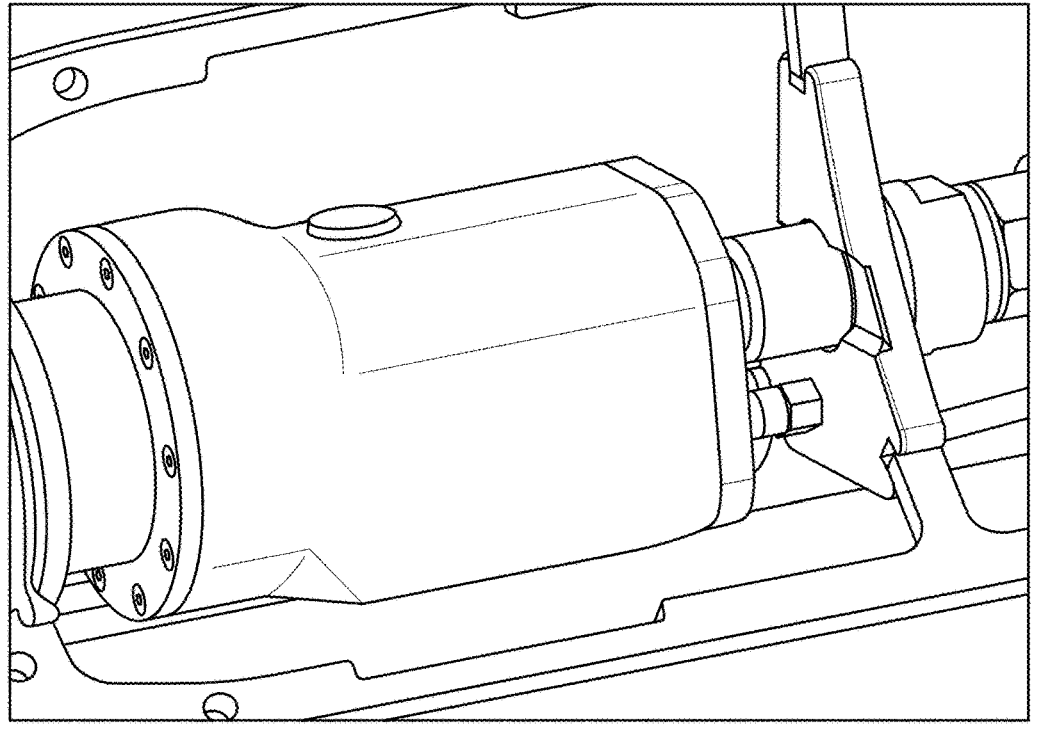
FIG. 13 shows the camera module and installed position in the sled with the rear member in the extended position and interengaged with the second mount.

The front and rear members are received in the first and second engagement members, respectively. Again, variations in the configuration of the front and rear members and the first and second engagement members will be obvious to those of skill in the art in light of the disclosure. In one embodiment, the second engagement member comprises a recess to receive the rear member. For example, referring to FIGS. 12 and 13, a recess 1201 is defined in the second mount 112. In this particular embodiment, there also channels 1202 leading to recess 1201 to help channel the rear portion 122 into the recess 1201. While FIG. 12 shows the rear member 122 in its retracted position, FIG. 13 shows the rear member 122 and its extended position and received by the recess 1201.

Figure 14:
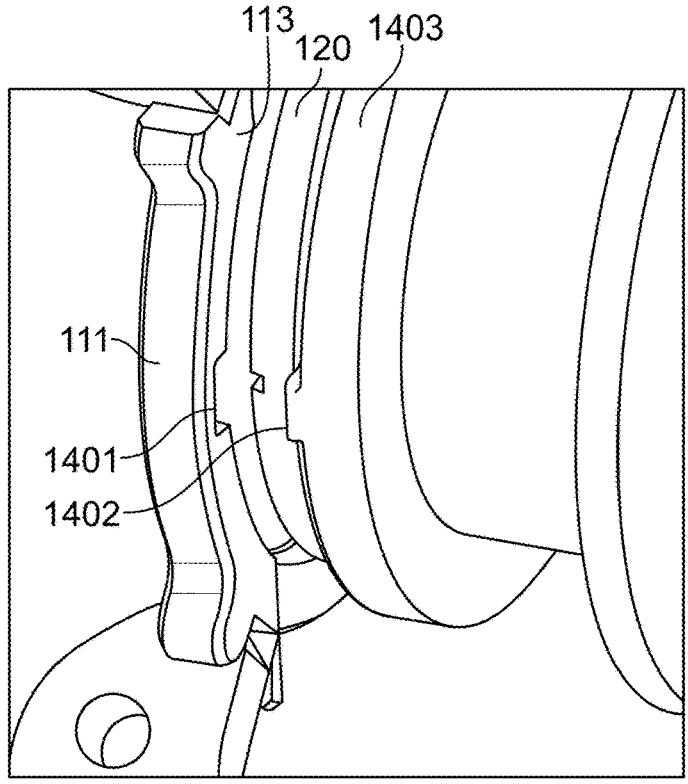
FIG. 14 shows a close up of the front portion of the camera module being made with the first mount.
Figure 15:
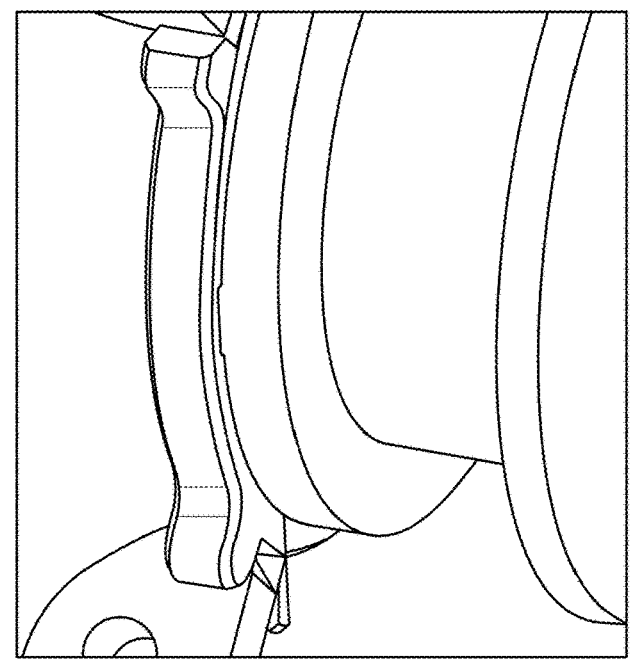
FIG. 15 shows the front portion of the camera module mated with the first mount.

Referring to FIGS. 14 and 15, one embodiment of the engagement mechanism between the front member 120 and the first engagement member 111 is shown. In this particular embodiment, the first mount comprises a first key 1401, and the front member comprises a second key 1402. The keys are configured such that the first and second keys interengage with an urging force provided by the rear member as described above to essentially lock the front member 120 into the first mount 111 as shown in FIG. 15. Such an inter-engagement prevents the camera module from moving laterally with respect to the central axis portion.

Alternatively, rather than keyways as shown in FIGS. 14 and 15, FIG. 11 shows an embodiment of the first engagement member 1101 of the first mount 1102 comprising walls 1103 to restrict rotation of the camera module once inserted in the first mount 1102.

The toolless interchangeability of the sleds with the camera module provides for versatility unmatched in conventional devices. In one embodiment, the system 100 comprises at least two sleds, a first sled and a second sled, the first and second sleds having different diameters. For example, in one embodiment, the first sled of is configured for a 6-inch pipe, and the second sled is configured for an 8-inch pipe. Although the diameters of the sleds may differ, in one embodiment, the first and second mounts of the first and second sleds have identical first and second engagement members, such that the first and second sleds are interchangeable with the camera module.

Figure 9:
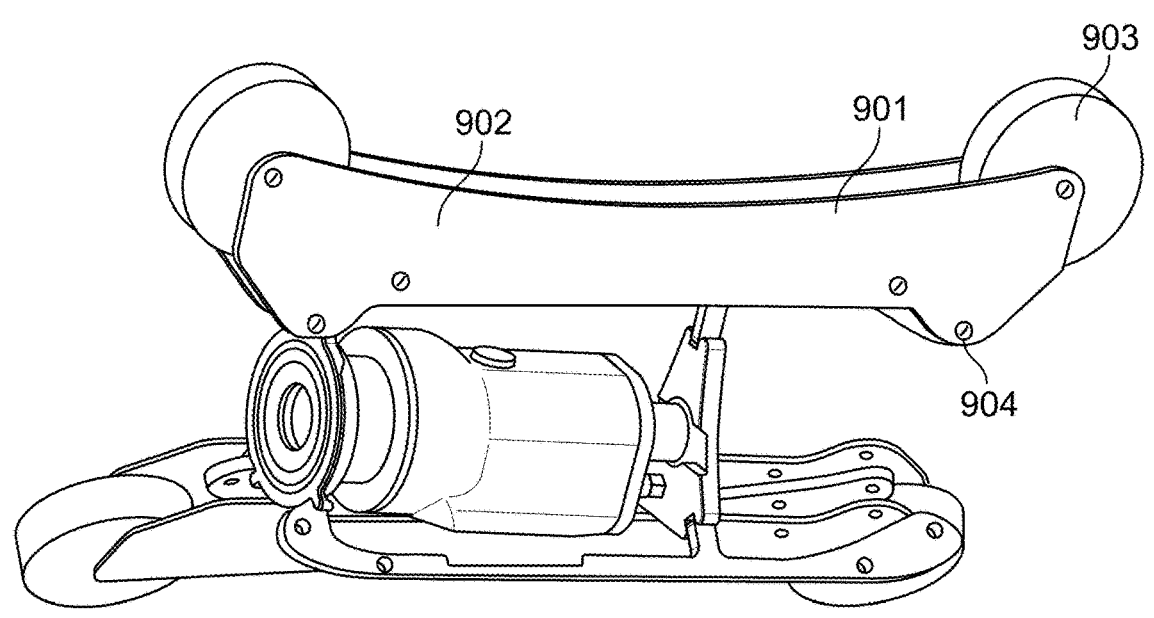
FIG. 9 shows one embodiment of the wheel extensions for the sled shown in FIG. 7.

Furthermore, to further increase the versatility of the system 100 to accommodate pipes of different sizes, in one embodiment, the system also comprises one or more wheel assemblies 901 configured for attachment to the rails of the second sled as shown in FIG. 9. Specifically, in one embodiment, the wheel assemblies 901 comprises a bracket 902 to which wheels 903 are attached. In one embodiment, the bracket 902 comprises fastener openings 904 which have the same pattern as the fastener openings 905 on the rails 115 as shown in FIG. 1. This configuration allows a bracket 902 to be attached readily to each rail.

In addition to the inter-engagement of the first and second engagement mechanisms with the front and back members respectively providing for toolless sleds interchangeability, the mechanism also provides for self-leveling. That is, in one embodiment, each sled comprises a self-leveling mechanism to allow the camera module to self level. More specifically, the first and second engagement mechanisms rotatably engage with the front and back members, respectively, such that the camera module rotates relative to the sled. Although various embodiments of self-leveling are possible, in one embodiment, the front member comprises an annular member 1403 which is rotationally connected to the camera module 120 as show in FIG. 14, such that when the annular member is interengaged with the first engagement member 113, the camera module rotates relative to the first mount 111. In one embodiment, the rear member 122 is circular and is received in a circular recess 1201 as shown in FIG. 12, allowing the rear member to rotate within the recess 1201. To facilitate self-leveling, in one embodiment, the camera module is configured such that a majority of its weight is below the optical axis such that the camera self-levels when connected to each sled. Still other embodiments of the self-leveling mechanism will be understood by those of skill in the art in light of this disclosure.

An important feature of one embodiment of the present invention is that the housing of the camera module has a very few breaches—i.e. openings. More specifically, the camera module is been designed with minimal breaches to compromise its interior, which often needs to be positively pressured to resist water infiltration.

In one embodiment, wireless transmission is used. For example, in one embodiment, the camera module comprises a wireless transmitter for transmitting images in the memory to an external receiver. For example, the wireless transmitter may be a Wi-Fi wireless transmitter. Such a feature is beneficial and that after the devices propelled up the pipe in question, the images from the camera can be downloaded wirelessly for review to a tablet/computer/smart phone/or other wirelessly connected device to review the condition of the pipe. In one embodiment, the wireless devices are configured to save certain screenshots along with documentation as to the position of the image for documentation purposes. Wirelessly communicating this information is a feature of the present invention, although not necessary, and provides a convenient way to view images without having to open up in any way the device.

Although wireless communication of the images is preferred, it is not essential. Indeed, in one embodiment, the device is configured with a communication port to download images via a cable. More specifically, referring to FIG. 5, one embodiment of the camera module 120 is shown with a port 501 for a cable connection (i.e. USB or mini USB) to the memory within the camera module 120. In this particular embodiment, the port comprises a cap 502 which is screwed to seal the port of contamination or loss of pressure from the camera module 120 as described below.

Figure 6:
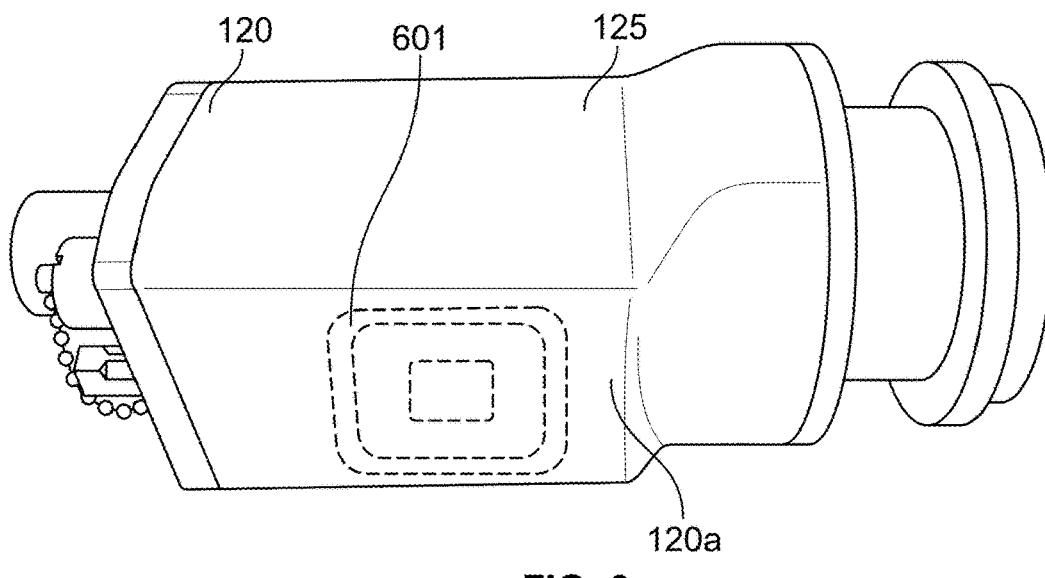
FIG. 6 shows a perspective view of the bottom of the camera module the system of FIG. 1, revealing the charging coil located at the bottom of the camera module.
Figure 7:
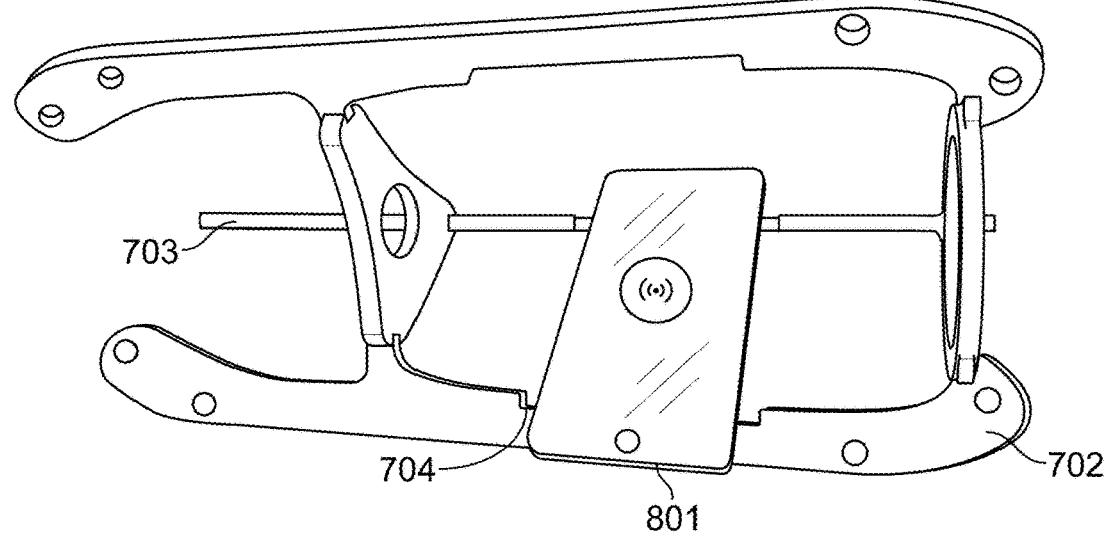
FIG. 7 shows a charger disposed in receiving notches of one embodiment of the sled.
Figure 8:
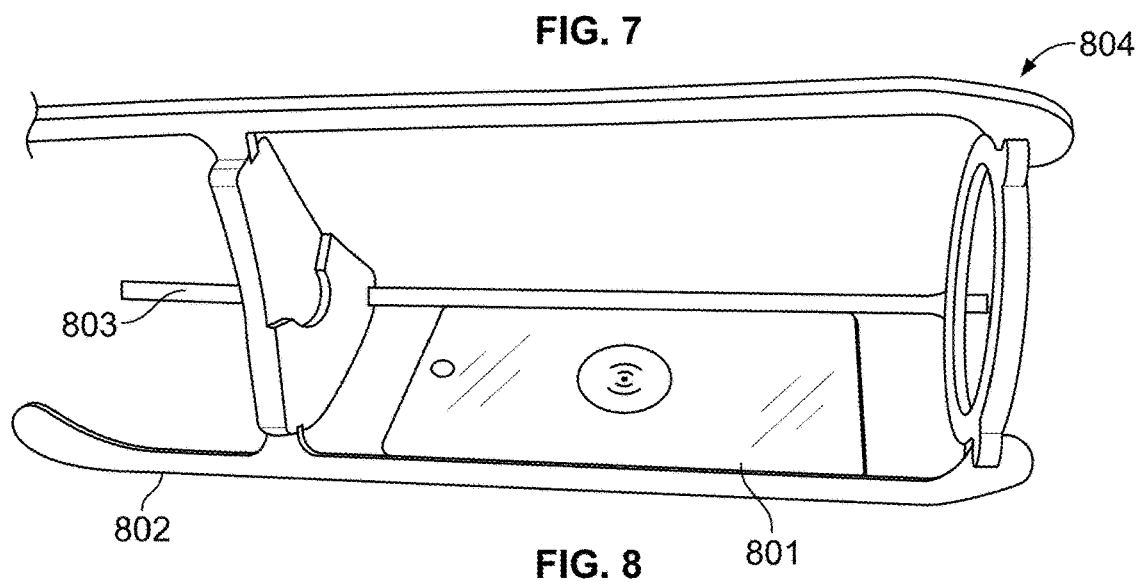
FIG. 8 shows the same charger received within the rails of another embodiment of the sled, smaller than the sled shown in FIG. 7.

In keeping with minimizing breaches in the camera module housing 125, in one embodiment, the camera module comprises a charging coil operatively coupled to the battery, the charging coil being configured for inductive coupling with an external charger to charge the battery. Specifically, referring to FIG. 6, one embodiment of the charging coil 601 can be seen through the translucent camera module housing 125. In this particular embodiment, the charging coil 601 is disposed at the bottom 120a of the camera module 120. Such a configuration provides for important benefits. For example, in one embodiment, the wireless charging allows the battery of the camera module is to be charged without being plugged in or in any way disassembled from the sled. To this end, in one embodiment, the system comprises a charger 801 having a form factor such that the charger fits between adjacent rails 802, 803 of the smallest sled 804 as shown in FIG. 8. In another embodiment, two rails 702, 703 are configured with notches 704 for receiving the charger 801 such that the charger is supported by the rails 703, 702 and disposed between the camera module and the two rails.

In keeping with the objective to minimize openings in the camera module housing, in one embodiment, the module comprises an internal pressure sensor to indicate when the pressure in the camera module is below a predetermined pressure.

Figure 4:
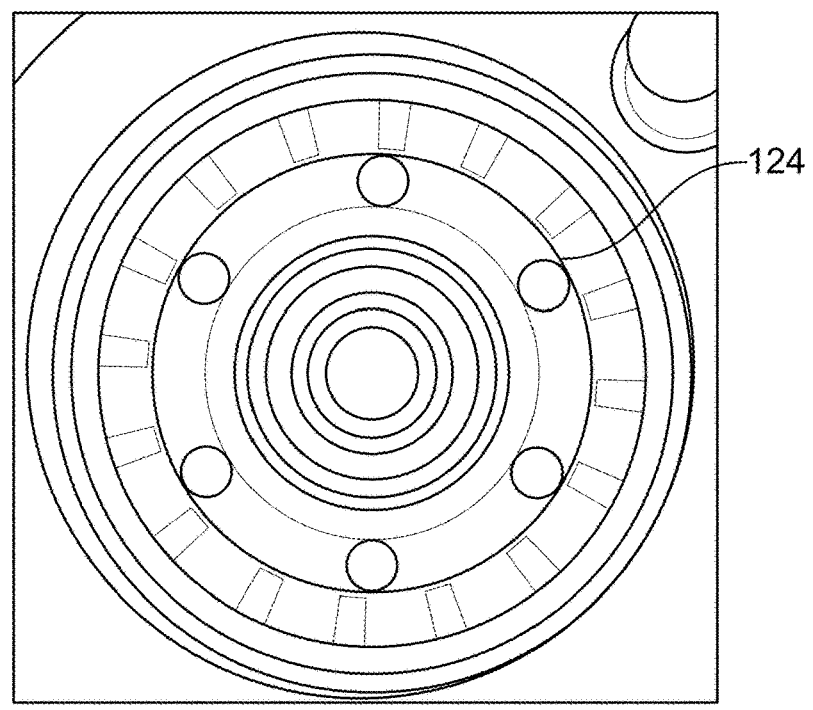
FIG. 4 shows a front view of the camera module of the system of FIG. 1.

Maintaining a positive pressure within the housing 125 of the camera module 120 is essential for ensuring that moisture/water does not penetrate the housing when the housing is submerged in liquid. In one embodiment, the internal pressure sensor is operatively connected to the one or more lights 124 is shown in FIG. 4, such that when the pressure in the camera module is below a predetermined pressure, the one or more lights turn on/off in a predetermined pattern. It should be understood that the predetermined pattern can take different forms. For example, in one embodiment, the predetermined pattern comprises lights 124 flashing on and off. Alternatively, the predetermined pattern may comprise turning on only a portion of the one or more lights. Regardless, such an obvious indication that the camera module is under pressurized is an important indication for a user. Such an indication can provide critical information to the user. For example, such information may be used to determine whether the device may be used for a wet or dry environment.

Figure 5:
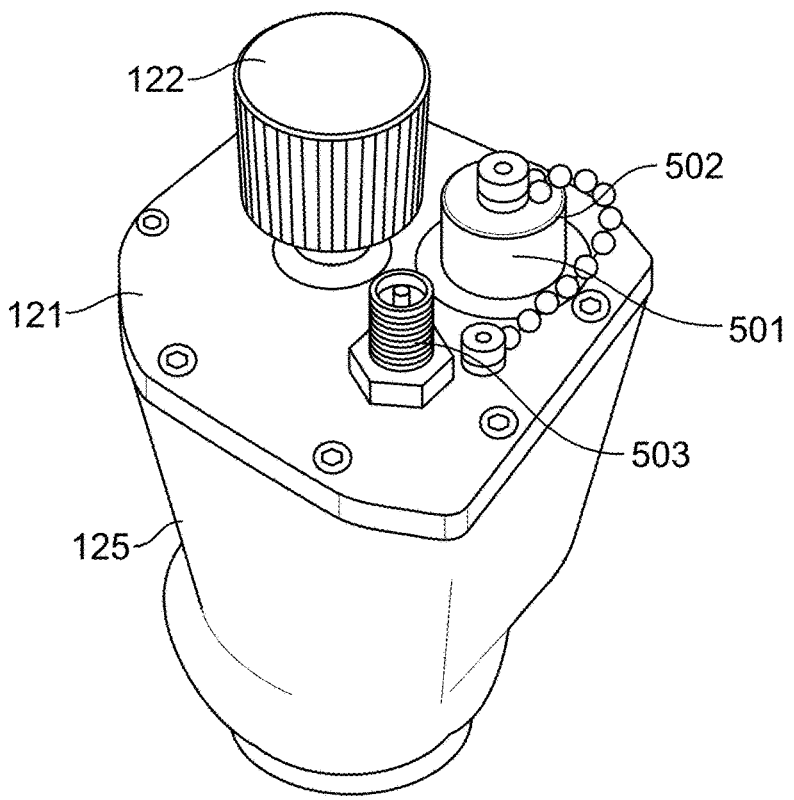
FIG. 5 shows a perspective review of the camera module of the system of FIG. 1.
Figure 10:
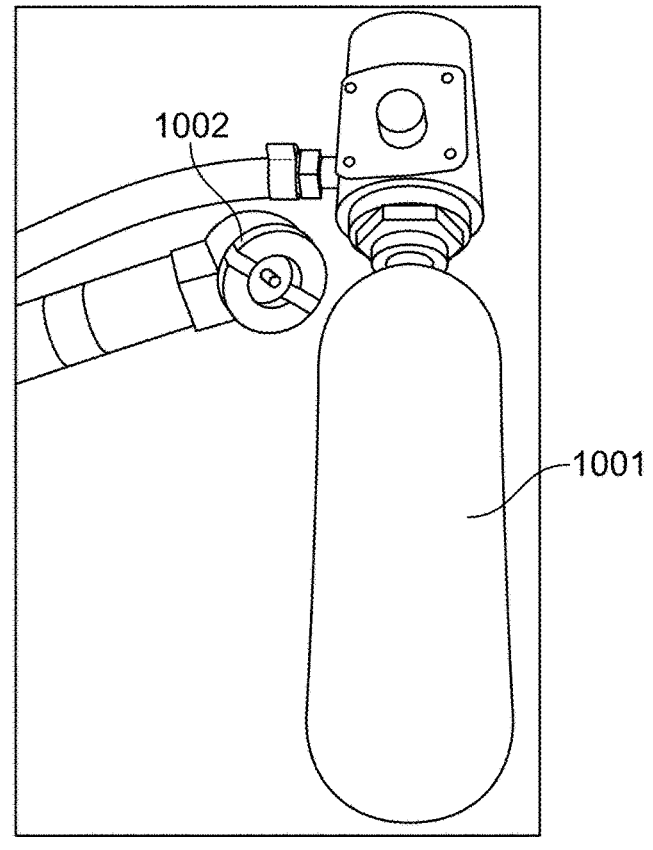
FIG. 10 shows one embodiment of a pressurizer for pressurizing the camera module.

Alternatively, such information may prompt the user to pressurize the camera module. To that end, the user may pressurize the camera module 120 using a pressurization device 1001 such as that shown in FIG. 10. In such an embodiment, the pressurization device 1001 may comprise a quick connect 1002 which is adapted for connection to a valve nipple 503 is shown in FIG. 5. Such connections are well known in the art and will not be described in detail herein. It is worthwhile to mention however that the valve 503 is accessible from the exterior of the housing.

In yet another embodiment in keeping with minimizing the breaches of the housing 125, the on-off switch for the camera may be disposed external to the housing and comprise a piezo switch which is turned on/off by finger pressure on the switch. Such a configuration not only minimizes effects from contamination, but also minimizes power required to turn the device on and off.

Referring back to FIG. 1, the nozzle 130 is generally well-known or otherwise obvious to those of skill in the art in light of the present disclosure. Suffice to say, the nozzle 130 functions to convey the camera module 120 down a pipe by virtue of pressurized water being expelled from the jets 132 (as shown in FIG. 11). Such nozzles are well known in the industry, but are used conventionally for cleaning the pipe, and not for conveying the camera down the pipe as disclosed herein. Indeed, one advantage of the present invention is that conventional nozzles can be adapted readily to carry the camera module 120 of the present invention. Typically, a nozzle comprises a body 134 to support the jets 132 and adapter 131. The adapter 131 may be any commercially-available hose coupling or similar device. Likewise, the hose (not shown) may be any commercially-available hose used in the pipe cleaning industry. Although it is generally preferred to pressurize the hose with water and expel the water through the jets 132 to propel the device down the pipe, other embodiments are possible. For example, rather than water, the hose can be pressurized with air such that air propels the nozzle down the pipe.

Although conventional nozzles may be used to practice the present invention, it should be understood that applicant anticipates nozzles being optimized for carrying camera systems. For example, such nozzles may be optimized to minimize lateral spray which may interfere with the imaging process. In this respect, the jets 132 can be configured to direct the spray of water axially and thus propel the nozzle more efficiently. Still other enhancements and optimizations of the nozzle 130 will be obvious to those of skill in the art in light of this disclosure.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

What is claimed is:

1. An inspection system comprising:
   at least two sleds, each sled comprising at least:
      a plurality of rails running lengthwise and defining a central axis of said each sled, wherein said central axis is equidistant from each of said plurality of rails;
      first and second engagement members for releasably interengaging front and rear engagement members of a housing of a camera module;
   at least one nozzle comprising an interface configured for connection to a hose and one or more jets configured for communicating fluid from said hose outward;
   said camera module comprising at least:
      said housing;
      a camera in said housing and defining an optical axis;
      said front and rear engagement members; and
   wherein, when said housing is mounted to said each sled, said optical axis is essentially coincident with said central axis.

2. The system of claim 1, wherein said at least two sleds comprise a first sled and a second sled, said first and second sleds being configured for pipes having different diameters.

3. The system of claim 2, wherein said first sled is configured for a 6-inch pipe, and said second sled is configured for an 8-inch pipe.

4. The system of claim 2, where said second sled comprises a wheel assembly configured for attachment to said rails of said first sled.

5. The system of claim 1, wherein said first and second sleds have identical first and second engagement members, such that said first and second sleds are interchangeable with said camera module.

6. The system of claim 1, wherein each sled comprises a self-leveling mechanism to allow said camera module to self level.

7. The system of claim 1, wherein said first and second engagement members and front and rear engagement members are configured to allow said camera module to rotate about said central axis to enable said camera module to self level.

8. The system of claim 1, wherein said camera is configured such that a majority of its weight is below said optical axis such that said camera self-levels when connected to said each sled.

9. The system of claim 1, wherein the interengagement between said rear member and said second engagement member allows for rotational movement between said camera and said nozzle.

10. The system of claim 1, wherein said camera module comprises memory in said housing operatively connected to said camera for recording images from said camera.

11. The system of claim 1, wherein said camera module comprises a wireless transmitter for transmitting images in said memory to an external receiver.

12. The system of claim 11, wherein said wireless transmitter is a Wi-Fi wireless transmitter.

13. The system of claim 1, wherein said camera module further comprises a charging coil operatively coupled to a battery, said charging coil being configured inductive coupling with an external charger to charge said battery.

14. The system of claim 1, wherein said camera module further comprises lights for illuminating a field of view of said camera.

15. The system of claim 1, wherein each sled comprises three rails.

16. The system of claim 1, wherein said nozzle has adjustable jets.

* * * * *